US007263878B2

(12) United States Patent
Griesser et al.

(10) Patent No.: US 7,263,878 B2
(45) Date of Patent: Sep. 4, 2007

(54) METHOD FOR IDENTIFYING TIRE CHARACTERISTICS

(75) Inventors: Martin Griesser, Eschborn (DE); Andreas Köbe, Bensheim (DE); Frank Edling, Frankfurt am Main (DE); Michael Holtz, Burgwedel-Töniz (DE); Karl Perras, Mühlacker-Enzberg (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 10/510,269

(22) PCT Filed: Apr. 11, 2003

(86) PCT No.: PCT/EP03/03780

§ 371 (c)(1),
(2), (4) Date: Oct. 5, 2004

(87) PCT Pub. No.: WO03/086789

PCT Pub. Date: Oct. 23, 2003

(65) Prior Publication Data

US 2005/0126274 A1    Jun. 16, 2005

(30) Foreign Application Priority Data

Apr. 17, 2002  (DE) ............... 102 17 133
Dec. 20, 2002  (DE) ............... 102 61 094

(51) Int. Cl.
    *G01M 17/02*   (2006.01)
(52) U.S. Cl. ...................................... 73/146
(58) Field of Classification Search .......... 73/146; 152/527
See application file for complete search history.

(56) References Cited

U.S. PATENT DOCUMENTS

| 2,419,902 | A |   | 4/1947  | Mager |
|-----------|---|---|---------|-------|
| 2,671,184 | A |   | 3/1954  | Kenty |
| 2,714,681 | A |   | 8/1955  | Keiffer et al. |
| 2,915,664 | A |   | 12/1959 | Lemmers |
| 2,916,645 | A |   | 12/1959 | Salo et al. |
| 2,965,789 | A |   | 12/1960 | Lemmers |
| 2,973,447 | A |   | 2/1961  | Aicher et al. |
| 3,013,169 | A |   | 12/1961 | Bitter et al. |
| 3,526,804 | A |   | 9/1970  | Morehead et al. |
| 4,078,339 | A | * | 3/1978  | Ongaro ............... 451/28 |

(Continued)

FOREIGN PATENT DOCUMENTS

DE    197 21 480 A1    11/1998

(Continued)

OTHER PUBLICATIONS

International Search Report of Application No. PCT/EP03/03780 dated Jun. 25, 2003.

*Primary Examiner*—Andre J. Allen
(74) *Attorney, Agent, or Firm*—RatnerPrestia

(57) ABSTRACT

The present invention relates to a method of detecting growth of the dynamic tire circumference (circumferential growth or tire growth), wherein at least one reference value Ref is produced on the basis of wheel speed information, said reference value representing in particular a sidewise and/or crosswise relation of the motor vehicle wheels, and wherein the time variation of the reference value(s) is examined and, further, tire growth is detected on the basis of said variation.

20 Claims, 6 Drawing Sheets

U.S. PATENT DOCUMENTS

| | | | |
|---|---|---|---|
| 4,084,350 A * | 4/1978 | Ongaro ......................... 451/5 |
| 5,248,957 A * | 9/1993 | Walker et al. ............... 340/444 |
| 5,583,483 A * | 12/1996 | Baumann .................... 340/444 |
| 6,362,570 B1 | 3/2002 | Chandler et al. |
| 6,718,818 B2 * | 4/2004 | Dutt et al. ..................... 73/49 |
| 2004/0011117 A1 * | 1/2004 | Dutt et al. ..................... 73/48 |

FOREIGN PATENT DOCUMENTS

| | | |
|---|---|---|
| EP | 0 441 600 A2 | 8/1991 |
| GB | 667070 A | 2/1952 |
| GB | 857711 A | 1/1961 |
| WO | WO0167486 A1 | 9/2001 |
| WO | WO0171770 A1 | 9/2001 |

* cited by examiner

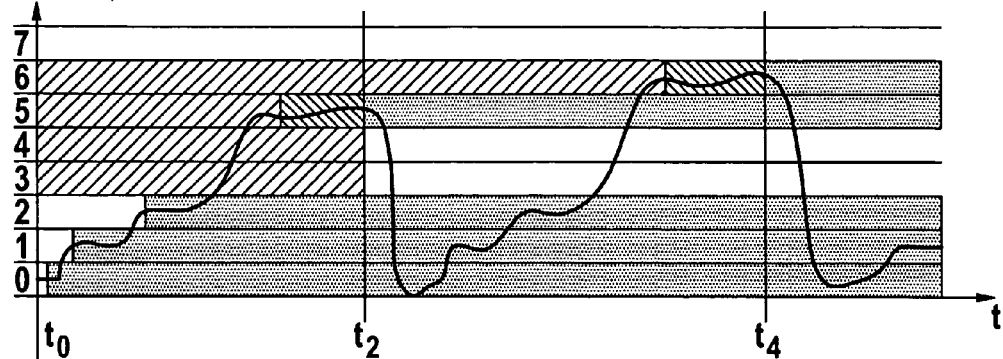
Fig. 2
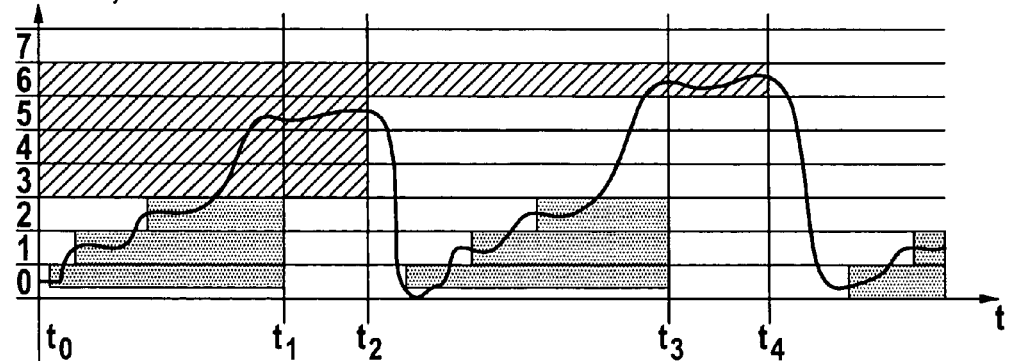

Fig. 5
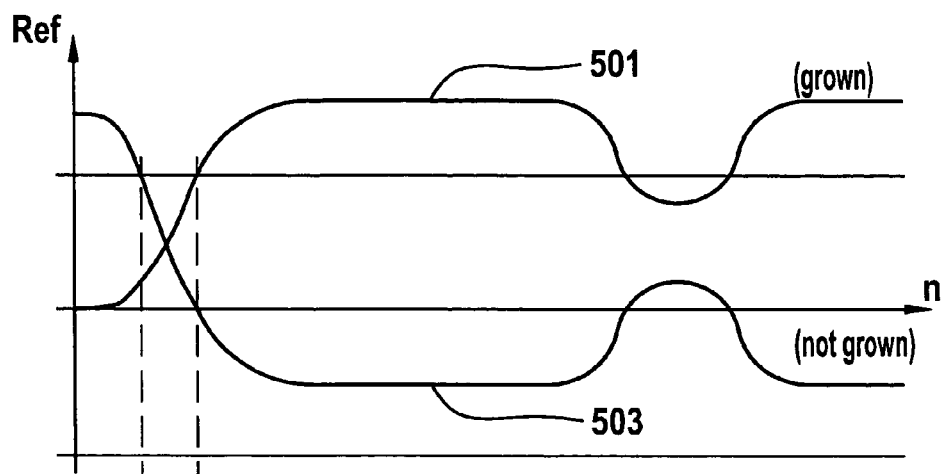
a)
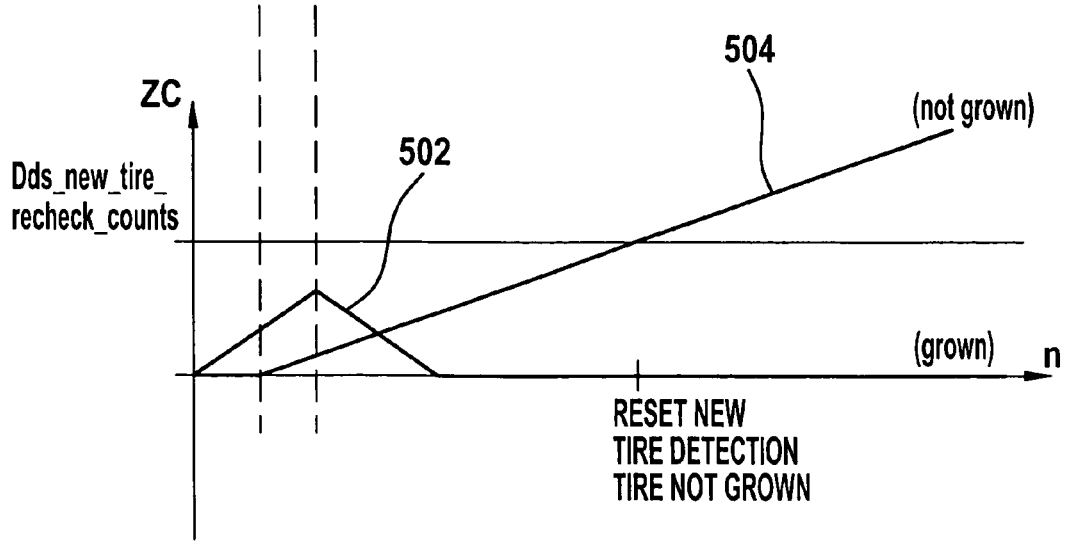
b)

METHOD FOR IDENTIFYING TIRE CHARACTERISTICS

TECHNICAL FIELD

The present invention relates to a method for identifying tire characteristics in an electronic control unit for motor vehicles.

The method of the invention allows detecting whether new tires are mounted on the vehicle.

BACKGROUND OF THE INVENTION

New tires can exhibit a constant growth of the dynamic rolling circumference until 1.0% of the rolling circumference, in particular when they are operated for the first time at high driving speeds. It has shown that the circumferential growth commences above a defined speed and lasts for a defined time. After this time the circumference does not continue growing, the growth of the new tire is completed. Further growth will only occur upon further increase of the speed.

Especially in a per se known method of tire pressure loss detection on the basis of wheel speed data alone (e.g. Deflation Detection System, DDS, Continental Teves AG & Co. oHG, Frankfurt, EP-A 0 983 154) it is of great significance for the accuracy of the detection to precisely know effects that relate to the dynamic rolling circumference. Therefore, the method of the invention is preferably implemented in a tire pressure detection method of this type as known from the art. Initially, the DDS algorithm collects driving data on the basis of the wheel speed information and calculates from this data a reference value (hereinbelow referred to as Ref) according to the per se known principle. Cleared from disturbances, the time variation Ref(t) represents in a particularly sensitive way deviations of the dynamic wheel circumference conditions. To begin with, the normal condition is learned after the new start (Reset) of the algorithm. The learning phase is terminated and a learned value produced when enough rotational speed values have been evaluated for the statistic evaluation. A comparison phase starts thereafter during which the actual detection of a pressure loss occurs. Current values of Ref are collected and averaged in the comparison phase. When a sufficient number of appropriate values have been collected, the averaged quantity is compared to the learned value for the pressure loss detection. When the tires are newly inflated or exchanged in the detection phase, this fact must be reported to the system by hand. However, the provision of detection devices is also possible which signal a corresponding change in the tires (DDS-Reset).

BRIEF SUMMARY OF THE INVENTION

The method is preferably implemented as an algorithm in a vehicle computer to which is sent, through corresponding inputs, information of the ABS wheel speed sensors. In a particularly favorable manner, the algorithm is implemented in a microprocessor-controlled brake control unit that is already connected to the wheel speed sensors. Said control unit is especially a control unit for conventional hydraulic brake systems or for up-to-date 'brake-by-wire' brake systems such as the electrohydraulic brake (EHB) or the electromechanical brake (EMB).

According to a preferred embodiment of the invention, learned values are produced separately for predetermined speed ranges in the DDS algorithm. It is this way possible to detect speed-responsive effects of the tires. The speed-responsive production of learned values is preferably effected in addition to the per se known production of learned values.

The method of the invention can be implemented in an especially simple manner when the observed tire growth does not occur at all four wheels at the same time. To determine the wheel at which tire growth occurs, it is preferred to evaluate several reference values that have been determined in different ways. Deviations will be encountered in the reference values determined e.g. sidewise, crosswise (diagonally) or axlewise, and the joint evaluation of the deviations permits determining the wheel position where tire growth occurred.

BRIEF DESCRIPTION OF THE DRAWINGS

FIG. 2 shows diagrams representing the time variation of the vehicle speed.

FIG. 5 is a detail view of further diagrams for illustrating the detection of tire growth.

DETAILED DESCRIPTION OF THE PREFERRED EMBODIMENTS

Figure 1:
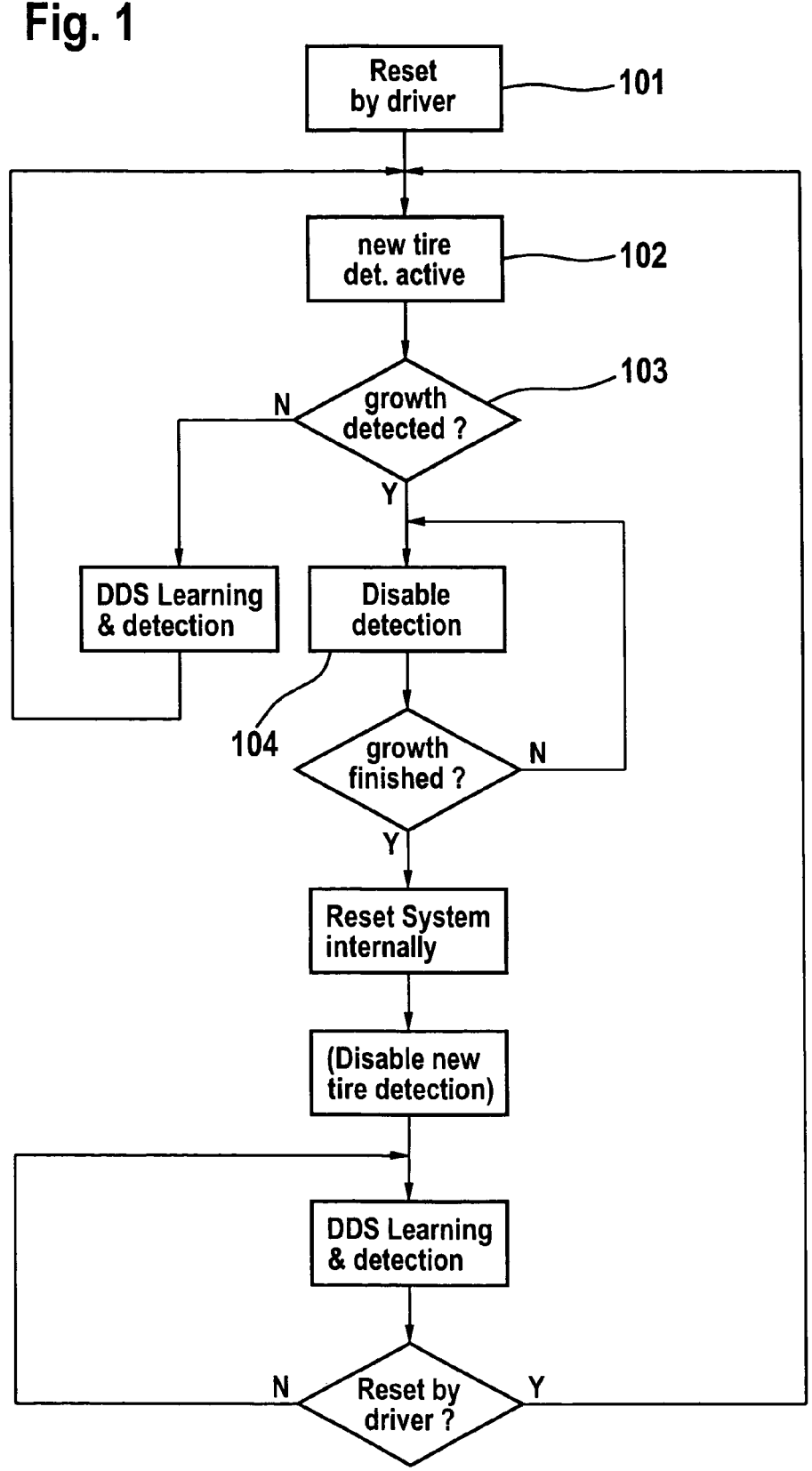
FIG. 1 shows an algorithm for tire pressure loss detection with a detection of new tires.

According to a first embodiment, it is first indicated to the system in step 101, FIG. 1, e.g. by way of a reset tip switch or an automatic detection device, that pressure in the tires was changed manually (e.g. pumping up of one or more tires or mounting of tires). Now, it must be checked whether new tires have been mounted in addition. To this end, the new tire detection function is activated in step 102 after pressing the reset tip switch. When new tire growth is detected in step 103, the pressure loss detection algorithm is deactivated during this time in step 104. The DDS algorithm is activated again after termination of the growth of new tires.

FIG. 2a) exhibits the detection by way of four tires where the new tire growth is already finished. Partial image b) shows the corresponding curve variation when at least one of the tires is a new tire with circumferential growth. The speed axis V is subdivided into speed intervals V0 to V7. Initially, the pressure loss detection method mentioned hereinabove records in the intervals individually during a learning phase the usual running characteristics of the vehicle wheels in different driving situations. When the learning phase is terminated, the comparison phase with the actual pressure loss detection is activated. The reset tip switch is pushed at time t0. A new tire is suspected at t1. DDS is disabled. At t2, after a reasonable waiting time in the range of 10 to 15 minutes approximately, there is certainty that tire growth in this speed range and in the underlying speed ranges is finished. Subsequently, DDS is reset completely so that the learning phase with the subsequent comparison phase is active again. Only with a repeated detection of a new tire (interval V6 at t3) will DDS be disabled again, and the detection of new tires is performed as described hereinabove.

Figure 3:
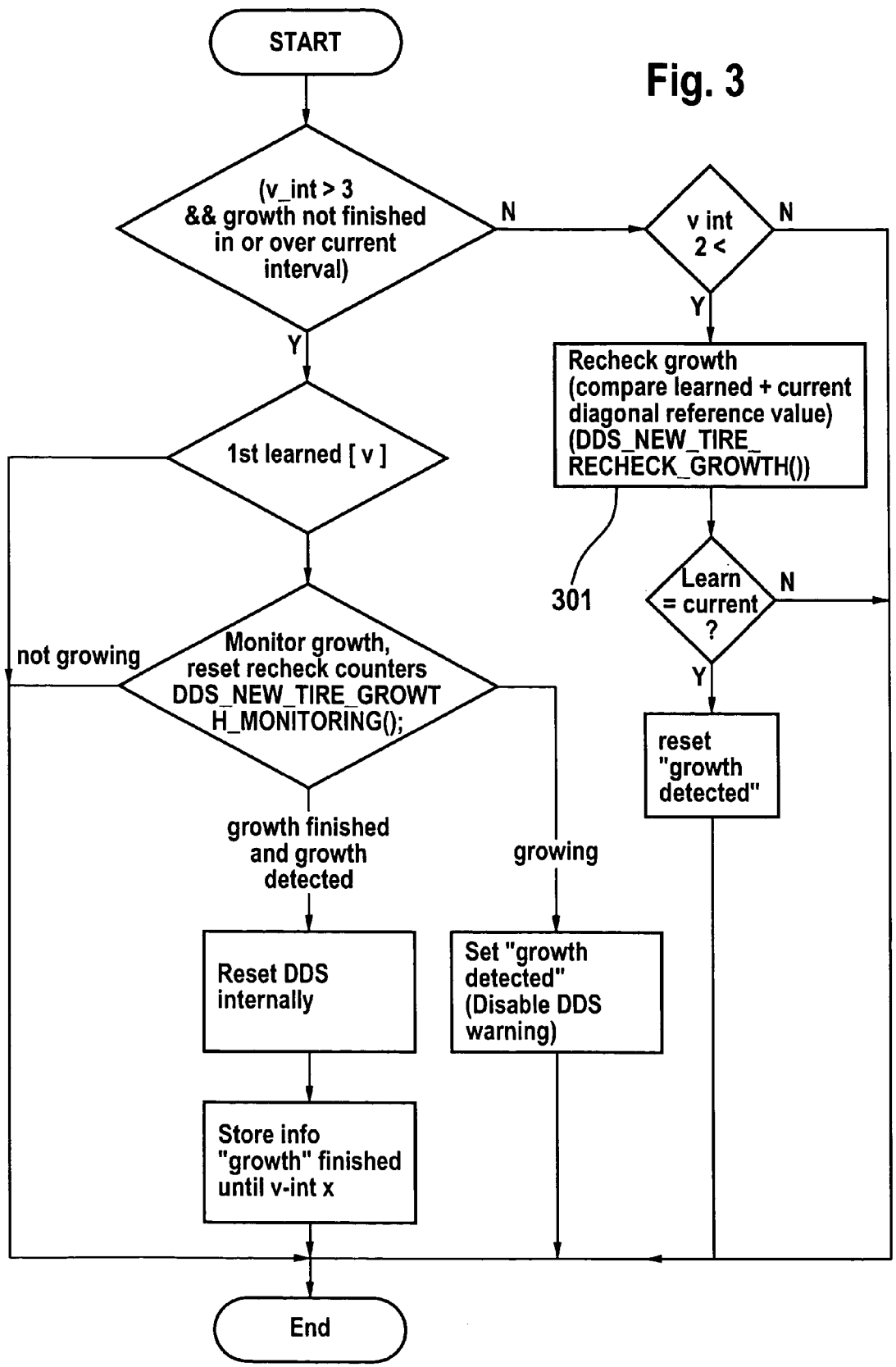
FIG. 3 is a detail view of an algorithm for tire pressure loss detection with new tire detection.

FIG. 3 shows the mode of function of the algorithm for the new tire detection in a DDS system in detail. The variable v_int indicates the instantaneous speed interval. To simplify the problem, it can be assumed for the detection that the new tire growth being detected will not occur before the first learned value was determined.

Figure 4:
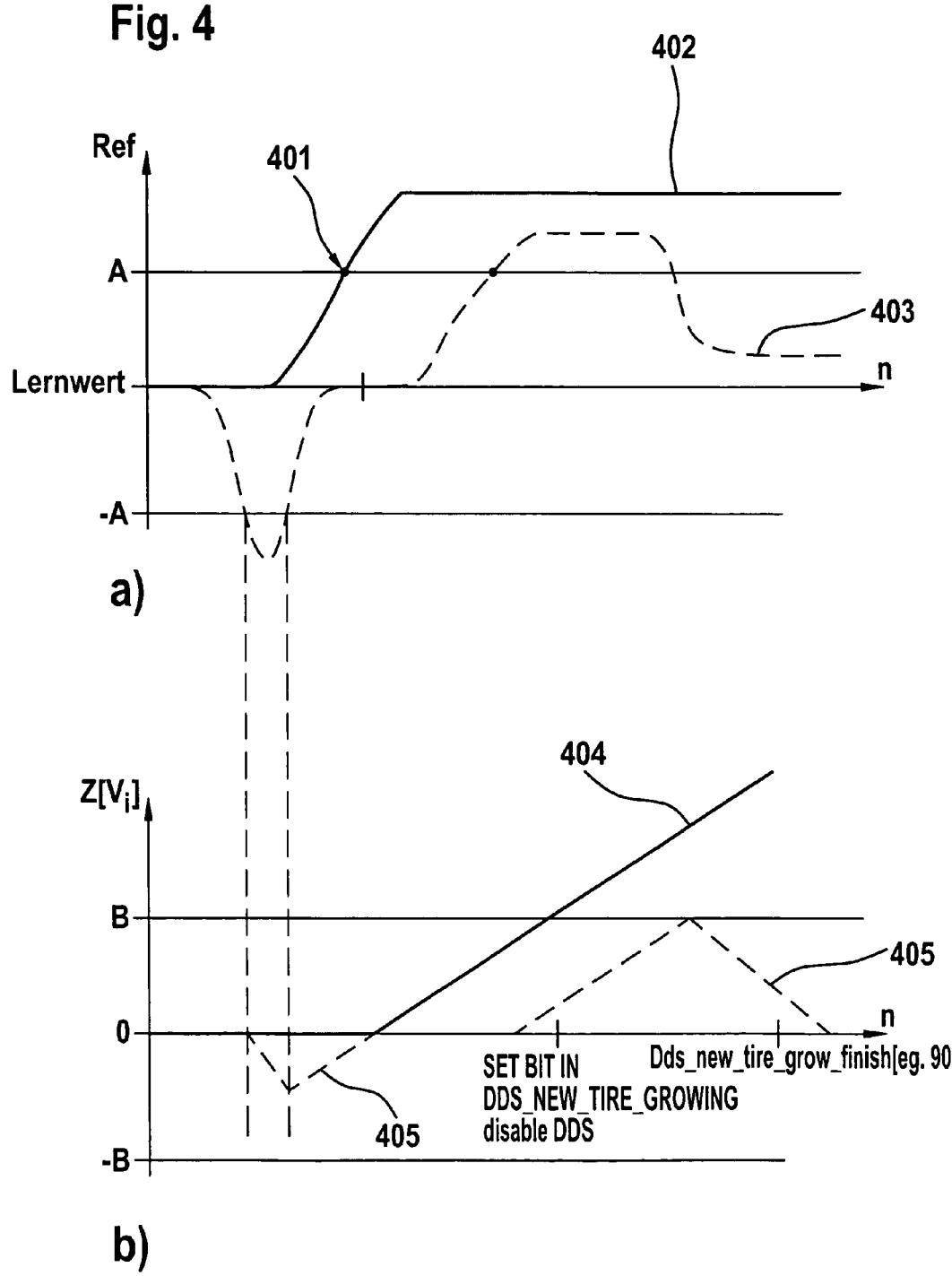
FIG. 4 is a detail view of an algorithm for the detection of tire growth.

FIG. 4 explains the mode of function of the new tire detection in detail. The growth of the tire circumference is written down individually for various speed intervals. The learned value for the instantaneous speed interval is compared with the value of the preferably averaged or filtered reference value Ref (Y-axis in partial image a)) according to the method. The number n of the data record (samples), which has been considered in the determination of reference values in the respective speed interval, is plotted on the x-axis. Curve 402 shows the variation of Ref during tire growth. Curve 403 shows the variation when tire growth is lacking. For the detection of tire growth in the instantaneous V-interval, a counter Z (Y-axis in the partial image b)) is used in each V-interval which is counted upwards when the value Ref is higher than the constant A. Counter Z is counted downwards when the value Ref is lower than a constant -A. Curve 404 indicates the count of Z during tire growth, while curve 405 relates to the example without tire growth. Number 401 designates the point of time commencing which the counter is counted upwards. When the counter, as illustrated in partial image b), reaches a top or bottom limit value (constant B), the flag 'growth detected' is set, whereby the algorithm is notified of a detection of tire growth.

When the vehicle has been driven in a V-interval ($V_i$) for a defined time, the algorithm assumes that the new tire growth is finished. Upon expiry of the predefined time, the flag 'growth finished in speed interval V' is set for this purpose.

Distinction Between Growth and Pressure Loss

According to the method of the invention a distinction can be made between a pressure loss and remaining tire growth in the following cases:

Case 1: The effect on Ref(t) as a result of pressure loss causes a high gradient and a high absolute amount compared to the remaining tire growth.

Case 2: Wheel detection according to the method described hereinbelow is possible.

Case 1, for example, concerns pressure loss during vehicle standstill after a learning operation in this speed interval or a very quick pressure loss. It is especially preferred that the count of the counter Z is once more counted downwards when the value of Ref reaches a second limit value (constant C). This protects the system against indicating growth of a new tire, although actually pressure loss prevails. The following physical relationship is assumed in case 2: Pressure losses at a wheel cause a smaller dynamic tire circumference and, hence, the detection of a faster rotating wheel. In contrast thereto, continuing tire growth would lead to a reduced rotational speed of the wheel. Growth in the case of detection of a fast wheel can be ruled out this way. In the last-mentioned case the counter for the pressure detection ZP is counted upwards by the value 1.

Consequences of Growth Detection

When new tire growth was detected in a V-interval, the flag 'growth detected' is set. In consequence of this, the counter ZP provided for pressure loss detection will not be counted further. Pressure loss warning is omitted because it is not activated until ZP has exceeded a predetermined count of the counter. When in addition growth no longer takes place in the current V-interval, the system is reset (Reset) so that the learning phase re-commences in all V-intervals. The information about the termination of the growth of the new tire in the respective V-interval is, however, stored by means of the system.

Avoiding Faulty New Tire Detection

The function 'recheck growth' (301 in FIG. 3) is used as a protection against a faulty new tire detection, it checks at low speeds e.g. below 100 k.p.h. In these low V-intervals, tire growth can no longer occur at least in those cases when tire growth has occurred already in a higher speed interval.

This is based on the following findings: When in the low speed interval the values Ref are close to the corresponding learned values and it was simultaneously detected that driving took place in a high speed interval, then tire growth cannot remain from driving in the high speed interval.

Avoiding an Incorrect Recheck

The function 'recheck growth' can also be incorrect when a V-interval for the recheck was not learned before the recheck function became active. A possible way out involves storing the status information about the learning operation at the time when the flag 'growth detected' is set. The recheck function can just have been activated when the second warning threshold in a low V-interval was learned for which the recheck function is provided. It should be noted that working with the first threshold values can lead to errors being caused by continued learning or restarted learning in the event of incorrect learning detection.

The information about the learning status at the moment of growth detection is stored in a variable or memory location provided for this purpose.

Resetting (Reset) and Initialization

The system can be fully reset when a Reset was detected by the driver or by a diagnosis function. The flags for detecting the new tire growth are not reset in the event of an internal DDS reset being possibly performed for any other reason.

According to a second embodiment, which can be used alternatively or in conjunction with the first embodiment, the DDS pressure loss detection method described hereinabove initially determines in a per se known manner three differently determined reference values, $Ref_{diag}$ (FIG. 6, reference numeral 6) for the relations of diagonals, $Ref_{side}$ for the relations of sides, and $Ref_{axle}$ for the relations of axles. After termination of a learning phase, learned values prevail for each of these reference values, by way of which pressure loss can be detected in a per se known manner by a comparison with currently determined reference values. Restart of the learning phase normally starts with the driver actuating a reset tip switch after a tire filling operation or after replacement of the tires or wheels.

It is preferably provided in addition that after response of the method for new tire detection, which triggers e.g. a restart of DDS, the detection is not activated a second time. It is thus prevented that the system constantly 'learns after' the current reference values with multiple DDS-Resets. Pressure loss detection that is appropriately sensitive would no longer be safeguarded in this case. More particularly, a new detection is possible again only when a signal has been generated for a DDS-Reset, for example after new tires have been mounted.

The expansion effect of a new tire described hereinabove can disturb the above pressure loss detection. Therefore, the corresponding effects of a new tire are taken into consideration in the following way.

Figure 6:
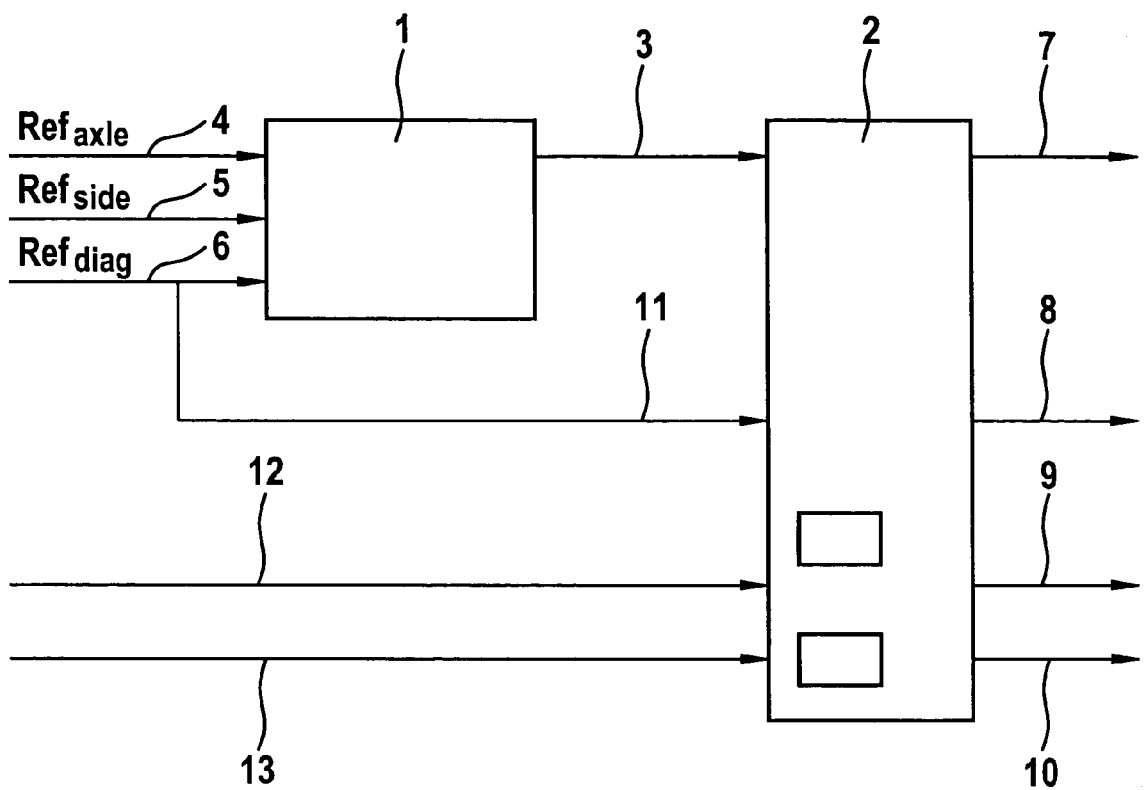
FIG. 6 shows the schematic mode of operation of the detection of new tires.

FIG. 6 is a diagrammatic view of the mode of function of the new tire detection. The function module 'DDS' (not shown) provides three differently determined reference values 4, 5, 6. According to the method, the difference between an acquired learned value and a currently determined (filtered) reference value is examined. When a tire grows, the corresponding wheel will rotate more slowly. This leads to a change of the reference value for the relation of diagonals, sides and axles. The change of the three values can be distinguished from the change during pressure loss. In function group 1 it is found out with the aid of further differently determined reference values, which wheel exhibits a new tire effect. This information is submitted by way of signal path 3 to a probability-monitoring device 2. When the change (difference between the respective Ref-value and the associated learned value) exceeds a first threshold that is lower than the DDS-threshold for pressure loss detection, tire growth is suspected. The probability that tire growth exists increases by further successively determined reference values when a current reference value likewise fulfils the above criteria. The probability is implemented by way of a simple counter in function module 2. When this counter exceeds a predefined threshold value, new tire growth is very likely to prevail. In this case, Reset-signals are sent to the module 'DDS' through lines 8, 9, 10. Line 7 temporarily disables the DDS function.

According to a preferred embodiment of the method, the reference value for the relation of diagonals is additionally processed by way of signal line 11. The threshold values for the evaluation of the relation of diagonals are set to be higher in comparison with the remaining reference values in the processing operation. It is this way possible to still further enhance the detection reliability of the new tire detection.

Line 12 transmits a quantity about the quality of the roadway condition and the signal quality determined by means of the function module 'DDS'. If the quality of the roadway or the signals is poor, the increase of the count of the counter is preferably suppressed when new tire growth is suspected.

Signal line 13 is provided to limit the detection of growth of a new tire to defined pre-selected kilometer readings. This function is based on the idea that starting with a defined kilometer reading that is to be fixed in an appropriate manner, new tire growth is no longer allowed to occur. It is preferred that the kilometer reading is related to the last DDS-Reset in order that a changing of tire will not be neglected by the system.

The method of the detection of growth of a new tire as described hereinabove can also be implemented separately for individual speed intervals. When, for example, the vehicle has been driven in a corresponding speed interval for a defined time, the algorithm assumes that the new tire growth is terminated only for this interval. Accordingly, it is also possible to learn and evaluate the reference values for different speed intervals independently of each other when a sufficient size of memory location is available.

A distinction between tire growth and pressure loss can also favorably be made in that a top threshold value is defined that cannot be exceeded by the influence of tire growth on the change of a reference value.

Further possibilities of distinguishing between tire growth and pressure loss:

The effect on a reference value as a consequence of pressure loss has a high gradient.

It is particularly preferred that the probability counter is counted downwards when the value of Ref reaches or exceeds the second limit value. This saves the system from indicating new tire growth when actually pressure loss prevails.

The invention claimed is:

1. Method of detecting tire growth of the dynamic tire circumference, wherein
   at least one reference value Ref is produced on the basis of wheel speed information,
   the time variation of the at least one reference value is examined, and
   tire growth is detected on the basis of said variation,
   wherein the tire growth is individually examined in predetermined speed ranges, and wherein the detected tire growth is stored in an electronic control unit.

2. Method as claimed in claim 1
   wherein the reference values produced are compared with acquired learned values, learned values for predetermined speed intervals are learned individually, and tire growth is detected based on the comparison.

3. Method as claimed in claim 2,
   wherein it is considered in a first, low speed interval whether tire growth has already occurred in a second interval of higher speed.

4. Method as claimed in claim 1,
   wherein in the case that the vehicle is in a predetermined speed interval for longer than a predetermined time, it is assumed that the tire growth in this interval is completed.

5. Method of detecting tire air pressure loss as claimed in claim 1,
   wherein one or more current reference values are compared with one or more learned values, and tire pressure loss is concluded in dependence on the deviation of the one or more reference values on the one or more learned values.

6. Method as claimed in claim 5,
   wherein the pressure loss detection system is deactivated while tire growth takes place or is detected.

7. Method as claimed in claim 5,
   wherein the sign of the rotational speed variation of the examined wheel is evaluated for making a distinction between pressure loss and tire growth.

8. Method as claimed in claim 7,
   wherein the first derivative of Ref(t) and the absolute rate of the deviation from the learned value is examined for making a distinction between pressure loss and tire growth.

9. Method as claimed in claim 1
   wherein for determining a mounting position of the wheel displaying tire growth
   a comparison is made of the variation of or the deviations from learned values between at least two differently determined reference values,
   and the differently determined reference values differ from each other in that they represent at least two of diagonal relations, side relations and axle relations.

10. Method as claimed in claim 9,
    wherein tire growth is concluded when the at least two reference values independently of each other allow detecting tire growth, which is possible by examining and comparing the sign of the observed variations of reference values.

11. Method as claimed in claim 1
    wherein the deviation between a reference value and a learned value for this reference value is examined, and a probability value is raised when this deviation of a first threshold value DDS_FOR_GROW is exceeded.

12. Method as claimed in claim 9,
    wherein the probability value has a probability threshold COUNT_GR the exceeding of which signals that tire growth prevails, and the degree of probability indicated by the probability counter depends on how frequently the threshold value DDS_FOR_GROW was exceeded during a defined period of time.

13. Method as claimed in claim 11,
wherein the probability value is raised only when one or more of the additional conditions
signal quality of the reference values,
quality of the roadway condition or
road section covered within a predetermined range is/are satisfied in addition.

14. Method as claimed in claim 1,
wherein tire growth is not concluded in the case that one or more reference values exceed a threshold value DDS_MAX_GROW.

15. Method as claimed in claim 1,
wherein the method of detecting new tires is reset into an initial condition when a tire change reset signal is detected.

16. Method as claimed in claim 15,
wherein if growth of a new tire is detected, an indirect pressure loss detection system (DDS) operating on the basis of the wheel speeds is reset into an initial condition (DDS-Reset).

17. Method as claimed in claim 1,
wherein said reference value Ref represents a sidewise relation of the motor vehicle wheels.

18. Method as claimed in claim 1,
wherein said reference value Ref represents a crosswise relation of the motor vehicle wheels.

19. Method as claimed in claim 1,
wherein said reference value Ref represents an axlewise relation of the motor vehicle wheels.

20. Method as claimed in claim 1,
wherein the electronic control unit utilizes the detected tire growth in a tire pressure loss detection system.

* * * * *